(No Model.) 3 Sheets—Sheet 1.
R. F. McFEELY.
VALVE GEAR FOR ENGINES.
No. 418,741. Patented Jan. 7, 1890.
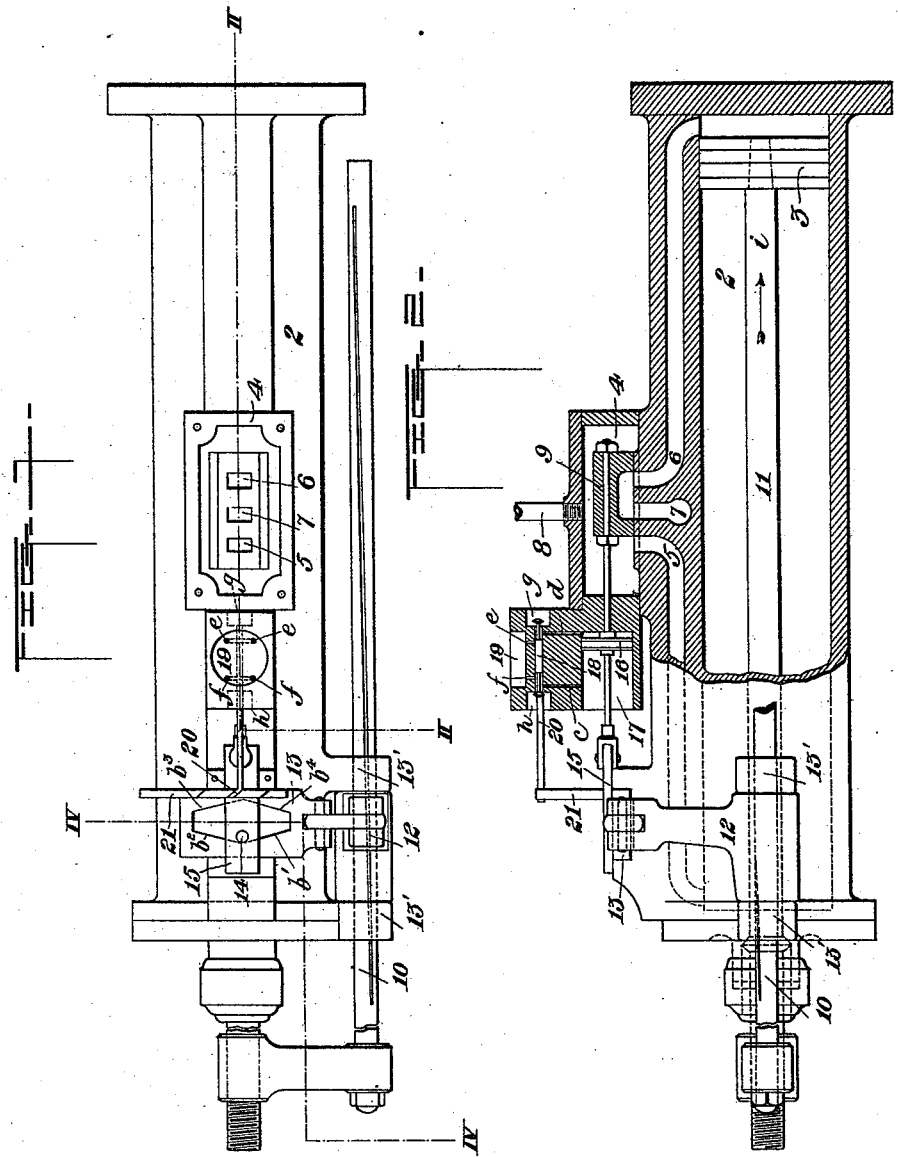
WITNESSES.
INVENTOR.
Ronald F. McFeely
by W. Bakewell & Sons
his Attorneys

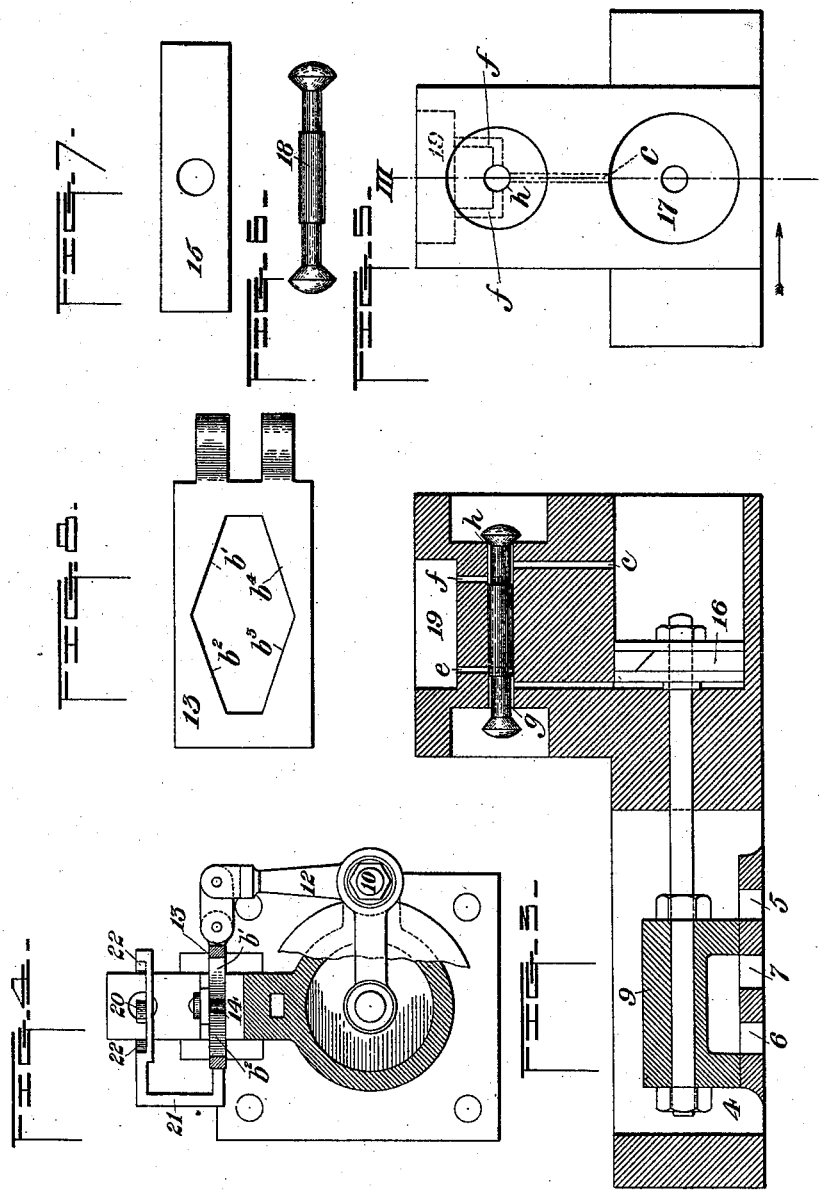

(No Model.)　　　　　　　　　　　　　　3 Sheets—Sheet 3.
R. F. McFEELY.
VALVE GEAR FOR ENGINES.
No. 418,741.　　　　　　　　　　Patented Jan. 7, 1890.
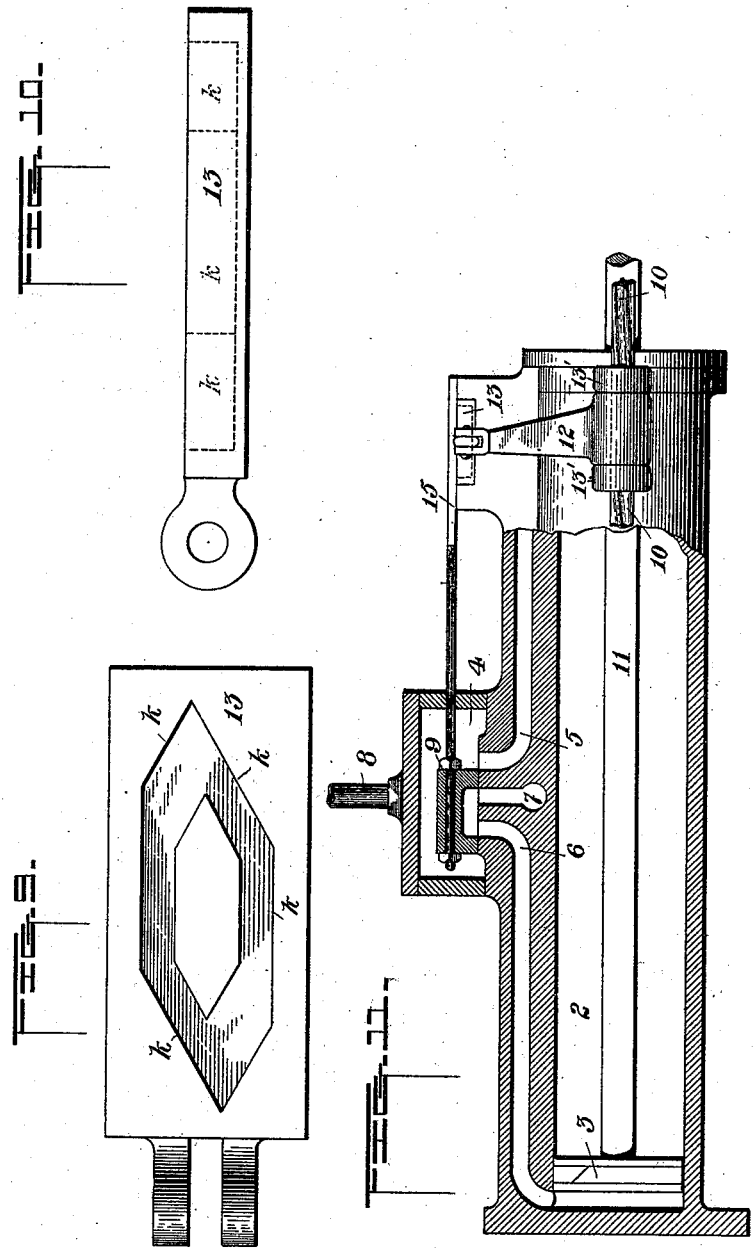
WITNESSES.　　　　　　　　　　　　　　INVENTOR.

UNITED STATES PATENT OFFICE.

RONALD F. McFEELY, OF PITTSBURG, PENNSYLVANIA.

VALVE-GEAR FOR ENGINES.

SPECIFICATION forming part of Letters Patent No. 418,741, dated January 7, 1890.

Application filed February 15, 1889. Serial No. 300,004. (No model.)

*To all whom it may concern:*

Be it known that I, RONALD F. MCFEELY, of Pittsburg, in the county of Allegheny and State of Pennsylvania, have invented a new and useful Improvement in Valve-Gear for Engines, of which the following is a full, clear, and exact description, reference being had to the accompanying drawings, forming part of this specification, in which—
Figure 1 is a plan view of a motor provided with my improved valve-gear. Fig. 2 is an irregular vertical longitudinal section on the line II II of Fig. 1. Fig. 3 is a vertical section on the line III III of Fig. 5, viewed in the direction of the arrow shown at the base of the latter figure. Fig. 4 is an end view of the machine, shown partly in section on the line IV IV of Fig. 2. Fig. 5 is an end view of Fig. 3. Fig. 6 is a plan view of one of the valves.
Fig. 7 is a plan view of the plate 15, shown in Figs. 1 and 2. Fig. 8 is a plan view of the cam-plate 13. Fig. 9 is a plan view of a modified form of the cam-plate 13. Fig. 10 is an edge view thereof. Fig. 11 is a partial longitudinal section of a motor provided with a modified form of my improvement.

In the several figures of the drawings the caps at the ends of some of the cylinders are omitted for clearness of illustration.
Like symbols of reference indicate like parts in each.

In the drawings, 2 represents the cylinder of a motor operated by the pressure of a fluid, such as compressed air, steam, or water.
3 is the piston.

4 is the valve-chest. 5 and 6 are ports leading therefrom to the opposite ends of the cylinder.

7 is the exhaust-port.
8 is the fluid-supply pipe or port, and 9 is the slide-valve which works over the several ports and serves to connect each of the ports 5 and 6 with the fluid-supply and with the exhaust in the usual manner.
10 is a rod arranged beside the cylinder 2, parallel with the piston-rod 11, and connected therewith at the end, as shown in the drawings. This rod is provided with a spiral groove and passes through the hollow end of an upright rocker-arm 12, which is set between brackets 13′ of the motor, so that as the piston-rod 11 reciprocates in the cylinder it shall move with it the rod 10, and by the spiral groove on the latter shall cause the arm 12 to rock axially on the rod 10.

The upper end of the rocker-arm 12 is pivotally connected to a movable stop consisting, preferably, of a cam-plate 13, which is set in a seat on the frame of the cylinder and is reciprocated longitudinally by the oscillation of the rocker-arm. The function of this cam-plate is to serve as a stop to limit and control the motions of the slide-valve, and to this end it is formed with a hole $b$, formed with inclined sides $b'$ $b^2$ $b^3$ $b^4$, as shown in Figs. 1 and 8, in which hole fits a projecting pin 14 of a plate 15, which is connected with the rod of the piston 16 of a small cylinder 17, whose piston-rod is also connected with the stem of the valve 9.

The piston 16 is operated by fluid admitted into the cylinder 17 through ports $c$ and $d$, which are controlled and connected with ports $e$ and $f$ by means of a valve 18. The ports $e$ and $f$ are each formed in two branches leading from a supply 19 and opening into the valve-passage on opposite sides of the valve, as shown in Fig. 5, so that the latter shall be balanced. The stem of the valve 18 has at its ends small studs or knobs adapted to seat on and to control exhaust-ports $g$ $h$ at the ends of the valve-passage, and as these exhaust-ports are large and are at the ends of the valve they create no pressure thereon. The construction of this valve is clearly shown in Fig. 6. The middle portion of the valve, which works over the ports, is enlarged, and between the enlarged portion and the knobs at the ends are contracted portions which permit the passage of water through the ports when in opposition thereto.

In the position in which the parts are shown in Fig. 2 the ports $e$ are closed, the port $d$ is connected with the exhaust-port $g$, and the ports $f$ are connected with the port $c$. The effect of this is to cause the water-pressure on the front of the piston 16 to tend to force it in the direction of the arrow $i$ and to exhaust the motive fluid from the rear of the piston through the ports $d$ and $g$, and if the valve 18 be reversed, so as to connect the ports $d$ and $e$ and to connect the port $c$ with the exhaust $h$, the fluid will tend to force the piston in the reverse direction, as will be readily understood. The ports $g$ and $h$ communicate with a common exhaust-passage. (Not shown in the drawings.)

In order to operate the valve 18, I provide it with a projecting stem 20, which is adapted to be moved longitudinally by means of devices attached to and moved with the cam-plate 13. The specific device which I show in the drawings for this purpose consists of an arm 21, attached to and projecting from the cam-plate. This arm is provided with inclined portions or cam-faces 22, which engage the end of the stem 20 as the cam-plate 13 reciprocates, and by such engagement impart to the stem a longitudinal motion, so that it shall be moved inwardly at one end of the stroke of the cam-plate and in the opposite direction at the other end of its stroke. For this purpose the end of the stem 20 is bent so as to conform to the inclination of these cam-faces, as shown in Fig. 1.

The operation of the apparatus is as follows: The cam-plate 13 is caused to reciprocate, as before explained, with the motion of the piston 3, and at the end of each stroke of the piston the cam-plate reaches likewise the end of its stroke in one direction or the other, and by means of the arm 21 and stem 20 shifts the valve 18. In Fig. 2 the parts are shown in the positions which they occupy before the piston 3 has reached the end of its stroke when traveling in the direction of the arrow $i$. When the piston reaches the end of its stroke, the valve 18 is tripped, as before described, thus changing the water-connections to the piston 16 and causing it to move in a reverse direction to that indicated by the arrow $i$, thus drawing back the slide-valve 9 over its ports. This piston is, however, prevented from moving at once to the full end of its stroke by engagement of the pin 14 on the plate 15 with the inclined side $b'$ of the cam-plate, and as this plate moves back the continued engagement of the pin 14 with this side restrains the movement of the piston 16 and the slide-valve 9, so that the slide-valve does not attain the full limit of its stroke until the middle portion of the cam-plate arrives at the position of the pin 14, as shown in Fig. 1. At this time the piston 3 will have reached the middle of its stroke, and during the remainder of its stroke the engagement of the inclined side $b^2$ with the pin 14 has the effect of gradually forcing back the slide-valve until the cam-plate and the piston reach the ends of their strokes. At this time the arm 21 will again trip the valve 18 and will reverse it, so as to cause the fluid-pressure to force the piston 16 in the direction of the arrow $i$. This will move the slide-valve until the pin 14 has passed from the inclined side $b^2$ into contact with the side $b^3$, and this motion being sufficient to reverse the passage of motive fluid to and from the cylinder 2 the piston will begin its stroke in the reverse direction, and the operations above described will be repeated.

From the foregoing description it will be seen that with the parts constructed as shown in the drawings the slide-valve assumes the position at which a full water-pressure is admitted to the cylinder only at the middle of the stroke, and as it nears the end of the stroke the slide-valve is correspondingly moved, so as to diminish the fluid-pressure. The purpose of this construction is to prevent the jarring or jerking motion of the motor at the ends of its stroke, which for many purposes is very objectionable. It will be understood, however, that by a simple change in the inclination of the inclined faces by which the pin 14 is guided the slide-valve may be controlled so as to admit full pressure at any portion of the stroke and to vary this pressure to the exact degree desired for the work in which the motor is to be used. I do not therefore intend by the exact description and illustration of the cam-plate and its accessory parts which I have given to limit the scope of my invention thereto, since the principle thereof is capable of a great variety of modifications, such as will suggest themselves to those skilled in the art. These modifications may consist not only in changes in the inclination of the inclined faces, but also in changes in the form, proportions, and mechanical connections of the cam-plate itself.

The mechanical devices which I have shown for tripping the valve 18 may also be modified in a number of ways. I have shown the form indicated in the drawings merely as illustrative of a class of mechanical devices applicable to this purpose.

While I regard the construction of the rod 10 with a spiral thread or groove as a means for actuating the cam-plate as a valuable improvement and intend to claim it specifically, I do not desire to limit the scope of my other claims thereto, since it may be replaced by other mechanical devices, such as a system of levers operated by the motions of the piston.

In Figs. 9 and 10 I show a modified form of the cam-plate 13, in which, instead of providing the cam-plate with a central hole, I provide it with a groove, in which the pin 14 fits. The inclined sides of this groove obviously serve the same purpose as the inclined sides of the cam-plate shown in the figures before described. In the use of the cam-plate shown in Fig. 9 the pin 14 follows the inclined surfaces which I have designated by the reference-letter $k$. The effect of this form of cam-plate in controlling the motions of the slide-valve will be readily understood by those skilled in the art.

In Fig. 11 I show a modified form of my improvement, in which the use of the primary valve 18 is dispensed with, and the slide-valve 9 is not provided with a special motor 16 for operating it, but is actuated solely by the cam-plate 13, connected by means of the pin 14 and plate 15 with the rocker-arm 12. In this case the cam-plate should be constructed in the manner shown in Figs. 9 and 10, so that a positive motion may be imparted thereby to the slide-valve. This form of the valve-gear may be found useful for many purposes, though I do not consider it to be so advantageous as the form of valve-gear illustrated on Sheets 1 and 2 of the drawings.

I claim—

1. The combination, with the main slide-valve of the engine and the valve-rod, of a reciprocating cam-plate arranged to move transversely to the line of said valve-rod and bearing thereon to limit and control its motions, and mechanism—such as a lever—connecting the cam-plate with the moving parts of the engine, substantially as and for the purposes described.

2. The combination, with the main valve of the engine, of an auxiliary piston actuating the same, and a cam-plate having inclined sides against which the rod or stem of the said main valve bears, and which thereby limit and control the motion of said rod or stem, substantially as and for the purposes described, 3. The combination, with the engine-valve, of a motive cylinder actuating the same, a stop which is moved with the moving parts of the engine and which limits and controls the motion of the engine-valve, a primary valve by which the motive fluid is admitted alternately to the ends of said motive cylinder, and mechanism for actuating the primary valve at predetermined points of the stroke of the piston, substantially as and for the purposes described.

4. A longitudinally-moving valve—such, for example, as the valve 18—having the exhaust-ports at the ends and supply-ports opening into the valve-passage in the middle portion and at opposite sides of the valve, for the purpose of balancing the same, substantially as described.

5. The combination, with the main cylinder and piston and the slide-valve, of a reciprocating spirally-threaded rod, a rocker-arm with which the spiral thread of the rod is in engagement, and a movable stop connected with said rocker-arm and bearing on the rod or stem of said slide-valve, substantially as and for the purposes described.

In testimony whereof I have hereunto set my hand this 8th day of February, A. D. 1889.

RONALD F. McFEELY.

Witnesses:
W. B. CORWIN,
THOMAS W. BAKEWELL.